United States Patent
Wang et al.

(10) Patent No.: US 9,843,510 B2
(45) Date of Patent: Dec. 12, 2017

(54) METHOD AND NETWORK DEVICE FOR SELECTING LABEL SWITCHED PATH

(71) Applicant: Huawei Technologies Co., Ltd., Shenzhen, Guangdong (CN)

(72) Inventors: Chongyang Wang, Beijing (CN); Jianjun Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 317 days.

(21) Appl. No.: 13/674,668

(22) Filed: Nov. 12, 2012

(65) Prior Publication Data
US 2013/0064127 A1   Mar. 14, 2013

Related U.S. Application Data

(63) Continuation of application No. PCT/CN2011/073758, filed on May 6, 2011.

(30) Foreign Application Priority Data

May 26, 2010   (CN) .......................... 2010 1 0189231

(51) Int. Cl.
*H04L 12/56*   (2006.01)
*H04J 1/16*   (2006.01)
(Continued)

(52) U.S. Cl.
CPC ............ *H04L 45/70* (2013.01); *H04L 45/127* (2013.01); *H04L 45/50* (2013.01)

(58) Field of Classification Search
CPC ......... H04L 12/56; H04L 45/70; H04L 12/54; H04L 45/50; H04L 45/127; H04L 12/26;
(Continued)

(56) References Cited

U.S. PATENT DOCUMENTS 7,082,102 B1 *   7/2006   Wright .......................... 370/229
7,769,002 B2 *   8/2010   Gong et al. ................... 370/359
(Continued)

FOREIGN PATENT DOCUMENTS

CN   101232511 A   7/2008
EP   2 043 311 A1   4/2009
(Continued)

OTHER PUBLICATIONS

Written Opinion of the International Searching Autority dated Aug. 18, 2011 in connection with International Patent Application No. PCT/CN2011/073758.
(Continued)

*Primary Examiner* — Edan Orgad
*Assistant Examiner* — Vanneilian Lalchinthang (57) ABSTRACT

The present invention relates to a method for selecting a label switched path LSP, which is applied in an MPLS network and includes: determining an energy engineering parameter of a network element itself in the network, where the network element is a network element on any candidate LSP between a source network element and a destination network element; receiving, by the network element, Interior Gateway Protocol IGP messages sent by other network elements in the network, and obtaining an energy engineering parameter of each of the other network elements; and selecting, according to the energy engineering parameter of the network element itself and the energy engineering parameter of each of the other network elements, a transmission path for the source network element and the destination network element.

11 Claims, 2 Drawing Sheets

(51) Int. Cl.
*H04L 12/26* (2006.01)
*H04L 12/721* (2013.01)
*H04L 12/723* (2013.01)

(58) Field of Classification Search
CPC ........ H04L 41/0833; H04B 7/212; H04J 1/16; H04W 40/08
USPC ........................................................ 370/252
See application file for complete search history.

(56) References Cited

U.S. PATENT DOCUMENTS

| | | | | |
|---|---|---|---|---|
| 7,844,839 | B2* | 11/2010 | Palmer et al. | 713/300 |
| 8,276,010 | B2* | 9/2012 | Vavilala et al. | 713/320 |
| 2006/0034252 | A1* | 2/2006 | Karaoguz | H04W 40/08 370/351 |
| 2007/0047444 | A1* | 3/2007 | Leroy | H04L 12/5601 370/235 |
| 2008/0084890 | A1* | 4/2008 | Kompella | 370/400 |
| 2010/0118881 | A1* | 5/2010 | Palmer | H04L 45/127 370/401 |
| 2010/0284287 | A1* | 11/2010 | Venuto | H04W 40/08 370/252 |
| 2011/0013517 | A1* | 1/2011 | So | 370/238 |
| 2012/0269510 | A1* | 10/2012 | Hui et al. | 398/50 |

FOREIGN PATENT DOCUMENTS

| | | | |
|---|---|---|---|
| EP | 2043311 A1 | * | 4/2009 |
| EP | 2166777 A1 | * | 3/2010 |
| EP | 2261811 A1 | * | 12/2010 |

OTHER PUBLICATIONS

H. Smit, et al., "Intermediate System to Intermediate System (IS-IS) Extensions for Traffic Engineering (TE)", Network Working Group, Jun. 2004, 13 pages.
D. Katz, et al., "Traffic Engineering (TE) Extensions to OSPF Version 2", Network Working Group, Sep. 2003, 14 pages.
C. Srinivasan, et al., "Multiprotocol Label Switching (MPLS) Traffic Engineering (TE) Management Information Base (MIB)", Network Working Group, Jun. 2004, 68 pages.
D. Awduche, et al., "RSVP-TE: Extensions to RSVP for LSP Tunnels", Network Working Group, Dec. 2001, 61 pages.
F. Le Faucheur, et al., "Multi-Protocol Label Switching (MPLS) Support of Differentiated Services", Network Working Group, May 2002, 64 pages.
Supplementary European Search Report dated Jun. 3, 2013 in connection with European Patent Application No. EP 11 78 6022.
International Search Report dated Aug. 18, 2011 in connection with International Patent Application No. PCT/CN2011/073758.

* cited by examiner

METHOD AND NETWORK DEVICE FOR SELECTING LABEL SWITCHED PATH

CROSS-REFERENCE TO RELATED APPLICATIONS

This application is a continuation of International Application No. PCT/CN2011/073758, filed on May 6, 2011, which claims priority to Chinese Patent Application No. 201010189231.3, filed on May 26, 2010, both of which are hereby incorporated by reference in their entireties.

TECHNICAL FIELD

The present invention relates to the field of communications, and in particular, to a method and a network device for selecting a label switched path.

BACKGROUND

Currently, with the rapid development of communication networks, the coverage area of networks increases continuously and high-performance network devices are continuously added to communication networks. Accordingly, the consumption of energy, particularly electric energy, by communication networks also increases continuously.

In the prior art, the energy consumption of a communication network can be reduced by using low power and low energy consumption network devices in the communication network. However, the electric power consumption of a device often increases along with the improvement of the performance of the device, and there is a small margin for reducing the energy consumption of the device without affecting the performance of the device, which cannot completely meet the requirement of operators on energy saving. Moreover, the method for reducing the energy consumption of the communication device itself requires the operator to replace existing devices on a large scale, resulting in considerable waste.

Moreover, another energy saving method exists in the prior art. In the method, power on and power off of the device are controlled according to service demands, so that the device is automatically powered off when employees are off duty, and is powered on in advance before employees go to work, thereby achieving energy saving and emission reduction. However, such a technology is not applicable to telecommunication network devices that are required to operate 7×24 hours.

Therefore, how to reduce the energy consumption of the network without affecting the performance of the device or replacing existing devices becomes an urgent task to be solved in the field of communications.

SUMMARY

An objective of the present invention is to provide a method, a device and a system for selecting a label switched path.

The technical solutions of the present invention are as follow:

Preferably, one aspect of the present invention includes a method for selecting a label switched path LSP, which is applied in an MPLS network including a source network element and a destination network element, and includes:

determining an energy engineering parameter of a network element itself in the network, where the network element is a network element on any candidate LSP between the source network element and the destination network element;

receiving, by the network element, Interior Gateway Protocol IGP messages sent by other network elements in the network, and obtaining an energy engineering parameter of each of the other network elements; and selecting, according to the energy engineering parameter of the network element itself and the energy engineering parameter of each of the other network elements, a transmission path for the source network element and the destination network element.

Preferably, another aspect of the present invention includes a network device, which includes:

an energy engineering parameter determining unit, configured to determine an energy engineering parameter of the network device;

an energy engineering parameter receiving unit, configured to receive IGP messages sent by other network devices in a network, and obtain an energy engineering parameter of each of the other network devices; and a transmission path selecting unit, configured to select, according to the energy engineering parameter of the network device itself and the energy engineering parameter of each of the other network devices, a transmission path for a source network device and a destination network device in the network.

Preferably, another aspect of the present invention includes a network device, which includes:

an energy engineering parameter receiving unit, configured to receive IGP messages sent by other network devices in a network, and obtain an energy engineering parameter of each of the other network devices; and a transmission path selecting unit, configured to select, according to the energy engineering parameter of each of the other network devices, a transmission path for a source network device and a destination network device in the network.

The advantage of the present invention is that the LSP path meeting energy consumption requirements can be selected as the transmission path preferentially, thereby reducing the energy consumption of the network.

DETAILED DESCRIPTION

The present invention is illustrated in detail below with reference to the accompanying drawings and specific embodiments. However, it should be noted that, the following embodiments are merely examples provided for ease of understanding of the technical solutions, and are not intended to limit the present invention.

In an embodiment of the present invention, a multiple protocol label switch (Multiple Protocol Label Switch, MPLS) network system includes a source network element and a destination network element, where the source network element and the destination network element are two network elements, which need to establish an LSP connection, among a plurality of network elements in the network system. A plurality of candidate label switched paths (LSPs) exists between the source network element and the destination network element. An energy engineering parameter of a network element itself in the network is determined, where the network element is a network element on any candidate LSP between the source network element and the destination network element, that is, the energy engineering parameter of the network element on any candidate LSP between the source network element and the destination network element in the network are determined. The network element receives Interior Gateway Protocol (Interior Gateway Protocol, IGP) messages sent by other network elements in the network and carrying an energy engineering parameter of each of the other network elements, and obtains the energy engineering parameter of each of the other network elements; and according to the energy engineering parameter of the network element itself and the obtained energy engineering parameter of each of the other network elements, a transmission path is selected for the source network element and the destination network element. Optionally, the network element sends an IGP message carrying the energy engineering parameter of the network itself to the other network elements in the network.

Figure 1:
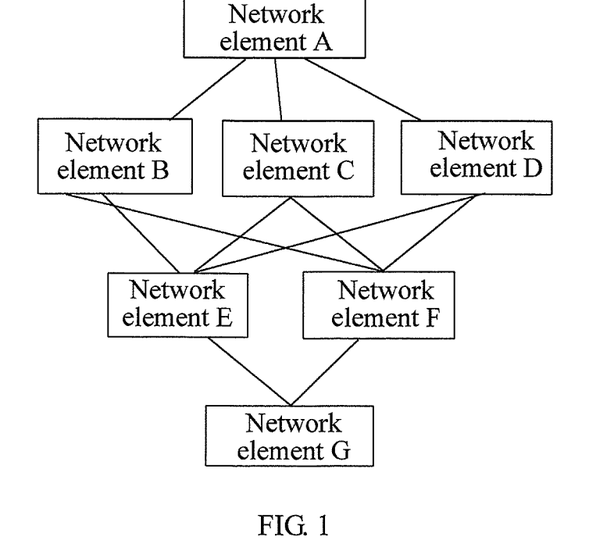
FIG. 1 is a schematic structural diagram of a network according to an embodiment of the present invention.

As shown in FIG. 1, an MPLS network system includes seven network elements, where an LSP transmission path needs to be established between a network element A and a network element G, where the network element A is used as a source network element, and the network element G is used as a destination network element; optionally, the network element G may be used as the source network element, and the network element A may be used as the destination network element. A plurality of candidate LSPs, for example, paths ABEG, ACFG and ADFG, exist between the source network element and the destination network element; each candidate LSP further includes a plurality of candidate sub-LSPs, and the candidate sub-LSPs are paths between neighboring network elements on the candidate LSP, for example, candidate sub-LSPs on the path ABEG include AB, BE and EG. On one LSP, a network element distant from the source network element by a small hop count is an upstream network element of a network element distant from the source network element by a large hop count. When the network element A is the source network element and the network element G is the destination network element, a network element distant from the network element A by a small hop count is an upstream network element of a network element distant from the network element A by a large hop count. For example, the network element A is an upstream network element with respect to the network element B, and the network element B is an upstream network element with respect to the network element C. Moreover, network elements on the candidate LSPs between the source network element and the destination network element are intermediate network elements of the source network element and the destination network element. For example, the network element B, the network element C, the network element ID, the network element E and the network element F are all intermediate network elements; the network element B is an upstream network element of the network element C, and both the network element B and the network element C are intermediate network elements.

As shown in FIG. 1, when the network element is the source network element A, a method for selecting a transmission path for the source network element A and the destination network element G includes:

determining an energy engineering parameter of the network element A itself;
receiving, by the network element A, IGP messages sent by other network elements, and obtaining an energy engineering parameter of each of the other network elements in the network, for example, obtaining respectively, by the network element A, energy engineering parameters of the network element B, the network element C, the network element ID, the network element E, the network element F and the network element G; and
selecting, according to the energy engineering parameter of the network element A itself and the obtained an energy engineering parameter of each of the other network elements, a transmission path for the source network element and the destination network element.

When the network element is the network element B, the method for selecting a transmission path for the source network element A and the destination network element G includes:

determining an energy engineering parameter of the network element B itself;
receiving, by the network element B, IGP messages sent by other network elements, and obtaining an energy engineering parameter of each of the other network elements in the network, for example, obtaining respectively, by the network element A, energy engineering parameters of the network element B, the network element C, the network element ID, the network element E, the network element F and the network element G; and
selecting, according to the energy engineering parameter of the network element B itself and the obtained energy engineering parameter of each of the other network elements, a transmission path for the source network element and the destination network element.

Optionally, the IGP messages that are sent by the other network elements and received by the network element further include a bandwidth parameter of each of the other network elements; and the IGP message sent by the network element to the other network elements further includes a bandwidth parameter of the network element. When a transmission path is selected from a plurality of candidate LSPs between the source network element and the destination network element, a transmission path meeting both bandwidth requirements and energy consumption requirements is selected according to the bandwidth parameter and the energy engineering parameter.

Optionally, the energy engineering parameter includes power consumption information of ports of the network element, or further includes a power supply mode coefficient of the network element, and may further includes other related information reflecting energy consumption of the network element.

When the energy engineering parameter is port power consumption information of the network element, an energy consumption value of the candidate LSP is a sum of power consumption of each network element port on the candidate LSP.

When the energy engineering parameter is the port power consumption information and the power supply mode coefficient of the network element, the energy consumption value is generated according to the port power consumption information and the power supply mode coefficient together. For example, when the power supply mode of the network element is wind power supply, the coefficient of the network element is a; when the power supply mode is solar power supply, the coefficient of the network element is b; when the power supply mode is nuclear power supply, the coefficient of the network element is c. Here, the magnitude of a coefficient corresponding to different power supply modes may be determined according to the degree of environmental pollution caused by the power supply mode, for example, a=b<c. The power consumption information of each port on the candidate LSP is multiplied by the power supply mode coefficient corresponding to the network element where the port is located, to obtain an energy consumption value of each port on the candidate LSP, and then the energy consumption values of each port on the candidate LSP are summed, so as to obtain the energy consumption value of the LSP.

Figure 2:
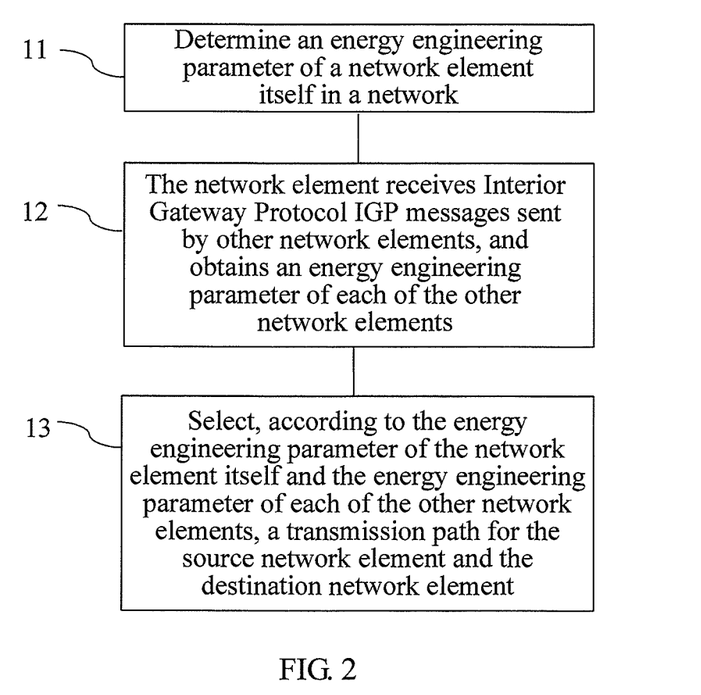
FIG. 2 is a flowchart of a method according to an embodiment of the present invention.

As shown in FIG. 2, one example embodiment of the present invention is as follows.

Step 11: Determine an energy engineering parameter of a network element in a network.

The energy engineering parameter includes port power consumption of the network element.

Optionally, the energy engineering parameter may further include a power supply mode coefficient of the network element.

The port power consumption of the network element is static power consumption or dynamic power consumption.

Optionally, a method for determining power consumption includes:

averagely distributing fixed power consumption of a device, for example, total power consumption of boards such as a control board, a cross-connect board and a fan, to all slots; obtaining power consumption of a line board; summing the averagely distributed fixed power consumption and the power consumption of the line board to obtain total power consumption of one slot; and averagely distributing the total power consumption of the slot to ports provided by the slot to users, so as to obtain port power consumption. The port power consumption is the energy engineering parameter.

When the power consumption of the line board is static power consumption, obtained port power consumption is port static power consumption.

Optionally, the static power consumption of the line board is rated power consumption of the line board.

Assuming that fixed rated power consumption of a device A is 1000 W, the device has 12 user slots, and rated power consumption of a board of a slot 1 is 230 w, static power consumption of the slot 1 is:

Power consumption $P1=1000/12+230=313$ W

If the board of the slot 1 provides 10 ports, rated power consumption of each port is:

Each port power consumption $P2=313/10\approx31.3$ W

For the convenience of calculation, the power consumption is rounded off, so that the results of calculation are all integers.

When the power consumption of the line board is dynamic power consumption, the obtained port power consumption is port dynamic power consumption.

Optionally, the dynamic power consumption of the line board is obtained based on the following equation:

$P=f(S \cdot T)=C+xS+yT$

In the equation, P represents dynamic power consumption of the port, S represents an added service, T represents traffic, C represents a constant, x is a coefficient representing influence of the service on the power consumption, and y is a coefficient representing influence of the traffic on the service. C may be obtained according to a laboratory test, and x and y may be obtained according to actual measurement.

Step 12: The network element receives IGP messages sent by other network elements, and obtains an energy engineering parameter of each of the other network elements.

Optionally, the IGP protocol includes an Open Shortest Path First (Open Shortest Path First, OSPF) protocol or Intermediate System to Intermediate System (Intermediate System to Intermediate System, IS-IS).

Optionally, the energy engineering parameter is carried by extending the OSPF protocol, and the extension manner is to add a sub-Type Length Value (sub-Type Length Value, sub-TLV) field for the OSPF message, and carry the energy engineering parameter of the network element in the added sub-TLV field.

Optionally, the energy engineering parameter is carried by extending the IS-IS protocol, and the extension manner is to add a sub-Type Length Value (sub-Type Length Value, sub-TLV) field for the IS-IS message, and carry the energy engineering parameter of the network element in the added sub-TLV field.

Step 13: Select, according to the energy engineering parameter of the at least one network element itself and the obtained energy engineering parameter of each of the other network elements, a transmission path for the source network element and the destination network element.

Optionally, the selecting the transmission path for the source network element and the destination network element may be executed by a network element on any candidate LSP between the source network element and the destination network element.

Optionally, the selection of the transmission path may be executed by a network element outside each candidate LSP. For example, the network element uploads the energy engineering parameter, which is of the network element and received by the network element, to a network management system by extending a management information base (MIB), and the network management system selects, according to the energy engineering parameter of the network elements between the source network element and the destination network element, the transmission path for the source network element and the destination network element, and realizes visualization of LSP energy consumption values, where the network management system is a network element outside each candidate LSP.

Optionally, a method for realizing the selection of the transmission path for the source network element and the destination network element is as follows:

determining each candidate LSP between the source network element and the destination network element;

obtaining respectively, by the network element, an energy consumption value of each candidate LSP according to the energy engineering parameter of each network element on each candidate LSP; and selecting, by the network element, a candidate LSP as the transmission path according to a preset policy after determining the energy consumption value of each candidate LSP.

Optionally, after each candidate LSP is determined, first, bandwidth information of each candidate LSP is determined, and candidate LSPs meeting bandwidth requirements are determined, and then the transmission path is selected according to the energy consumption values of each candidate LSP meeting the bandwidth requirements.

In the method for selecting the transmission path for the source network element and the destination network element, the energy consumption values of the candidate LSPs need to be determined.

Optionally, when the energy engineering parameter is the port power consumption of the network element, the determining the energy consumption values for each candidate LSP between the source network element and the destination network element includes: determining network element ports belonging to the candidate LSPs on each candidate LSP, and determining port power consumption corresponding to the ports; and summing the port power consumption on each candidate LSP to obtain total power consumption of each candidate LSP respectively, that is, obtain the energy consumption value of each candidate LSP.

Optionally, when the energy engineering parameter is the port power consumption of the network element and the power supply mode coefficient of the network element, the determining the energy consumption values for each candidate LSP between the source network element and the destination network element includes:

determining each network element on each candidate LSP and ports on the network element that belong to the candidate LSP, and determining port power consumption corresponding to the ports;

determining the power supply mode coefficient corresponding to each network element on each candidate LSP, for example, when the power supply mode of the network element is wind power supply, the coefficient of the network element is a; when the power supply mode is solar power supply, the coefficient of the network element is b; when the power supply mode is nuclear power supply, the coefficient of the network element is c, where the magnitude of the coefficient corresponding to different power supply modes may be determined according to the degree of environmental pollution caused by the power supply mode and the degree of reusability, and the network element causing less pollution or having high degree of reusability is set to be preferentially used, for example, a=b<c;

multiplying the port power consumption on each candidate LSP respectively by the coefficients corresponding to the network elements where the ports are located, to obtain energy consumption values of each network element on each candidate LSP; and summing the energy consumption values of each network element on each candidate LSP respectively to obtain the energy consumption value of each candidate LSP.

In the above method for realizing the selection of the transmission path, a path having the smallest energy consumption value may be selected as the transmission path, or a path having an energy consumption value closest to a preset value may be selected as the transmission path, according to requirements or a method for setting an energy consumption value.

Optionally, another method for realizing the selection of the transmission path for the source network element and the destination network element is as follows:

determining each candidate LSP between the source network element and the destination network element;

using the source network element or the destination network element as an initial upstream network element, comparing an energy consumption value of each candidate sub-LSP of the upstream network element, and selecting a candidate sub-LSP as a transmission sub-path, where each candidate sub-LSP of the upstream network element is a path between the upstream network element and an intermediate network element neighboring to the upstream network element, and the intermediate network element is a network element on any candidate LSP between the source network element and the destination network element;

determining whether the intermediate network element is the destination network element or the source network element;

if not, using the intermediate network element as a new upstream network element to continue selecting a transmission sub-path; and if being the destination network element or the source network element, determining a transmission path between the source network element and the destination network element by determining each selected transmission sub-path.

Optionally, when a candidate sub-LSP is selected as the transmission sub-path, first, bandwidth information of each candidate sub-LSP is determined, and candidate sub-LSPs meeting bandwidth requirements are determined, and then the transmission sub-path is selected according to the energy consumption values of each candidate sub-LSPs meeting the bandwidth requirements.

In the method for selecting the transmission path, the energy consumption values of the candidate sub-LSPs need to be determined.

Optionally, when the energy engineering parameter is the port power consumption of the network element, the determining the energy consumption values for the candidate sub-LSPs on the candidate LSPs between the source network element and the destination network element specifically includes: determining ports on each candidate sub-LSP, and summing the port power consumption corresponding to the ports to obtain the energy consumption value of each candidate sub-LSP, that is, obtain the energy consumption value of the candidate sub-LSP.

Optionally, when the energy engineering parameter is the port power consumption of the network element and the power supply mode coefficient of the network element, the determining the energy consumption values for each candidate sub-LSP between the source network element and the destination network element includes:

determining ports on each candidate sub-LSP, and determining port power consumption corresponding to the ports;

determining the power supply mode coefficient of the network element corresponding to each port on each candidate LSP;

multiplying the port power consumption of the ports on each candidate sub-LSP by the power supply mode coefficients of the network elements where the ports are located, to obtain energy consumption values of the network elements on each candidate sub-LSP; and summing the energy consumption values of the network elements on each candidate sub-LSP to obtain the energy consumption value of each candidate sub-LSP.

In the above method for realizing the selection of the transmission path, a path having the smallest energy consumption value may be selected as the transmission path, or a path having an energy consumption value closest to a preset value may be selected as the transmission path, according to requirements or a method for setting an energy consumption value.

Optionally, the network element uses an IGP message to send the energy engineering parameter of the network element to other network elements supporting the extended IGP protocol. The IGP protocol includes an OSPF protocol and an IS-IS protocol.

An embodiment of the present invention is as follows.

Figure 3:
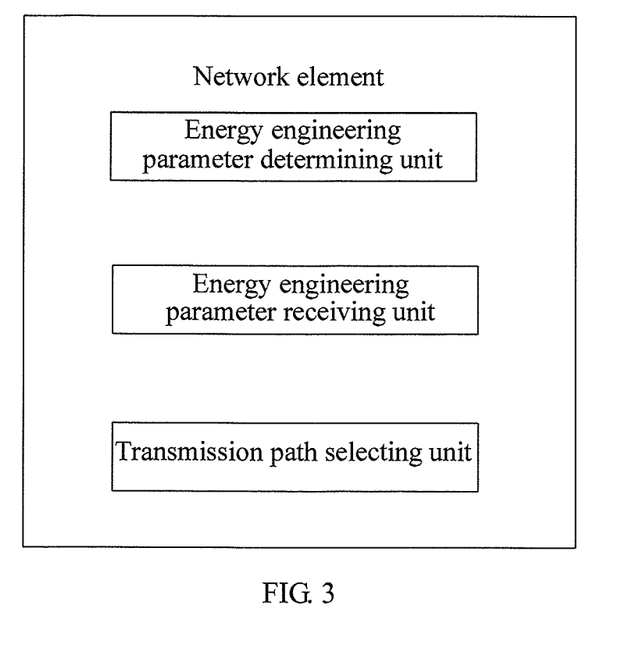
FIG. 3 is a schematic diagram of a device according to an embodiment of the present invention.

A network device may be applied in a network system, where the network system includes a source network device being the network device and a destination network device. The network device is configured to determine an energy engineering parameter of the network device; receive IGP messages sent by other network devices in a network, and obtain an energy engineering parameter of each of the other network devices; and select, according to the energy engineering parameter of the network device itself and the energy engineering parameter of each of the other network devices, a transmission path for the source network device and the destination network device in the network.

The network device includes an energy engineering parameter determining unit, an energy engineering parameter receiving unit and a transmission path selecting unit.

The energy engineering parameter determining unit is configured to determine the energy engineering parameter of the network device. The energy engineering parameter includes port power consumption of the network device. Optionally, the energy engineering parameter may further include a power supply mode coefficient of the network device.

Optionally, the energy engineering parameter determining unit averagely distributes fixed power consumption of the network device, for example, total power consumption of boards such as a control board, a cross-connect board and a fan, to all slots; obtains power consumption of a line board; sums the averagely distributed fixed power consumption and the power consumption of the line board to obtain total power consumption of one slot; and averagely distributes the total power consumption of the slot and provides to ports of users, so as to obtain port power consumption.

When the power consumption of the line board is static power consumption, the obtained port power consumption is port static power consumption.

Optionally, the static power consumption of the line board is rated power consumption of the line board.

Assuming that fixed rated power consumption of a device A is 1000 W, the device has 12 user slots, and rated power consumption of a board of a slot 1 is 230 w, static power consumption of the slot 1 is:

Power consumption $P1=1000/12+230=313$ W

If the board of the slot 1 provides 10 ports, rated power consumption of each port is:

Each port power consumption $P2=313/10=31.3$ W≈31 W

For the convenience of calculation, the power consumption is rounded off, so that the results of calculation are all integers.

When the power consumption of the line board is dynamic power consumption, the obtained port power consumption is port dynamic power consumption.

Optionally, the dynamic power consumption of the line board is obtained based on the following equation:

$P=f(S\cdot T)=C+xS+yT.$

In the equation, P represents dynamic power consumption of the port, S represents an added service, T represents traffic, C represents a constant, x is a coefficient representing influence of the service on the power consumption, and y is a coefficient representing influence of the traffic on the service. C may be obtained according to laboratory tests, and x and y may be obtained according to actual measurement.

The energy engineering parameter receiving unit is configured to receive the IGP messages sent by the other network devices in the network, and obtain the energy engineering parameter of each of the other network devices.

The transmission path selecting unit is configured to select, according to the energy engineering parameter of the network device itself and the energy engineering parameter of each of the other network devices, the transmission path for the source network device and the destination network device in the network.

Optionally, the transmission path selecting unit includes an LSP energy consumption value determining sub-unit and a first selecting sub-unit.

The LSP energy consumption value determining sub-unit is configured to obtain an energy consumption value of each candidate LSP respectively according to the energy engineering parameter of each network device on each candidate LSP.

The first selecting sub-unit is configured to select a candidate LSP as the transmission path according to the energy consumption value of each candidate LSP and a preset policy.

Optionally, when the energy engineering parameter is the port power consumption of the network device, the LSP energy consumption value determining sub-unit is configured to determine network device ports belonging to the candidate LSPs on each candidate LSP, and determine port power consumption corresponding to the ports; and sum the port power consumption on each candidate LSP to obtain total power consumption of each candidate LSP respectively, that is, obtain the energy consumption value of each candidate LSP.

Optionally, the transmission path selecting unit may also select, according to the energy engineering parameters and bandwidth parameters of the network devices on each candidate label switched path LSP between the source network device and the destination network device, the transmission path for the source network device and the destination network device.

Optionally, when the energy engineering parameter is the port power consumption of the network device and the power supply mode coefficient of the network device, the LSP energy consumption value determining sub-unit is configured to determine each network device on each candidate LSP and ports on the network device that belong to the candidate LSP, and determine port power consumption corresponding to the ports;

determine the power supply mode coefficient corresponding to each network device on each candidate LSP;

multiply the port power consumption on each candidate LSP respectively by the coefficients corresponding to the network devices where the ports are located, to obtain energy consumption values of each network device on each candidate LSP; and respectively sum the energy consumption values of each network device on each candidate LSP to obtain the energy consumption value of each candidate LSP.

Optionally, the transmission path selecting unit may also select, according to the energy engineering parameters and bandwidth parameters of the network devices on each candidate label switched path LSP between the source network device and the destination network device, the transmission path for the source network device and the destination network device.

Optionally, the transmission path selecting unit includes a transmission sub-path selecting sub-unit and a second selecting sub-unit.

Configured to use the source network device or the destination network device as an initial upstream network device, compare an energy consumption value of each candidate sub-LSP of the upstream network device, and select a candidate sub-LSP as a transmission sub-path, where each candidate sub-LSP of the upstream network device is a path between the upstream network device and an intermediate network device neighboring to the upstream network device, and the intermediate network device is a network device on any candidate LSP between the source network device and the destination network device.

The second selecting sub-unit is configured to determine whether the intermediate network device is the destination network device or the source network device;

if not, use the intermediate network device as a new upstream network device to continue selecting a transmission sub-path; and if being the destination network device or the source network device, determine a transmission path between the source network device and the destination network device by determining each selected transmission sub-path.

Optionally, when the energy engineering parameter is the port power consumption of the network device, the LSP energy consumption value determining sub-unit is configured to determine ports on the candidate sub-LSP, and sum the power consumption corresponding to the ports to obtain the energy consumption value of the candidate sub-LSP.

Optionally, the transmission path selecting unit may also select, according to the energy engineering parameters and bandwidth parameters of the network devices on each candidate label switched path LSP between the source network device and the destination network device, the transmission path for the source network device and the destination network device.

Optionally, when the energy engineering parameter is the port power consumption of the network device and the power supply mode coefficient of the network device, the sub-LSP energy consumption value determining sub-unit is configured to determine ports on the candidate sub-LSP, and determine port power consumption corresponding to the ports;

determine the power supply mode coefficient of the network device corresponding to each port on each candidate LSP;

multiply the port power consumption of each port on each candidate sub-LSP by the power supply mode coefficients of the network devices where the ports are located, to obtain energy consumption values of each network device on each candidate sub-LSP; and sum the energy consumption values of the network devices on the candidate sub-LSP to obtain the energy consumption value of the candidate sub-LSP.

Optionally, the transmission path selecting unit may also select, according to the energy engineering parameters and bandwidth parameters of the network devices on each candidate label switched path LSP between the source network device and the destination network device, the transmission path for the source network device and the destination network device.

Optionally, the network device further includes an energy engineering parameter sending unit. The energy engineering parameter sending unit uses an extended IGP message to send the energy engineering parameter thereof to other network devices supporting the extended IGP protocol.

In this embodiment, the energy engineering parameter sending unit supports the extended IGP protocol. Through the energy engineering parameter sending unit, a plurality of network devices in an MPLS network can carry energy engineering parameters of the network devices in the extended IGP messages, and send the messages to other network devices supporting the extended IGP protocol in the network.

Optionally, the energy engineering parameter sending unit includes an Open Shortest Path First (Open Shortest Path First, OSPF) protocol extending sub-unit, configured to extend an OSPF protocol in the IGP protocol, and the extension manner is to add a sub-Type Length Value (sub-Type Length Value, sub-TLV) field for the OSPF message, and carry the energy engineering parameter of the network device in the added sub-TLV field.

Optionally, the energy engineering parameter sending unit includes an Intermediate System to Intermediate System (Intermediate System to Intermediate System, IS-IS) protocol extending sub-unit, configured to extend an IS-IS protocol in the IGP protocol, and the extension manner is to add a sub-Type Length Value (sub-Type Length Value, sub-TLV) field for the IS-IS message, and carry the energy engineering parameter of the network device in the added sub-TLV field.

Optionally, the network device further includes a candidate LSP determining module, configured to determine candidate LSPs between the source network device and the destination network device.

Optionally, the network device further includes a candidate sub-LSP determining module, configured to determine candidate sub-LSPs between the source network device and the destination network device.

An embodiment of the present invention is as follows.

A network device includes an energy engineering parameter receiving unit and a transmission path selecting unit.

The energy engineering parameter receiving unit is configured to receive IGP messages sent by other network devices in a network, and obtain an energy engineering parameter of each of the other network devices; and the transmission path selecting unit is configured to select, according to the energy engineering parameter of each of the other network devices, a transmission path for a source network device and a destination network device in the network. Here, the IGP message includes an OSPF message or IS-IS message.

Optionally, the transmission path selecting unit includes an LSP energy consumption value determining sub-unit and a third selecting sub-unit.

The LSP energy consumption value determining sub-unit is configured to obtain an energy consumption value of each candidate LSP respectively according to the energy engineering parameter of each network device on each candidate LSP.

The third selecting sub-unit is configured to select a candidate LSP as the transmission path according to the energy consumption value of each candidate LSP and a preset policy.

Optionally, the transmission path selecting unit includes a transmission sub-path selecting sub-unit and a fourth selecting sub-unit.

The transmission sub-path selecting sub-unit is configured to use the source network device or the destination network device as an initial upstream network device, compare an energy consumption value of each candidate sub-LSP of the upstream network device, and select a candidate sub-LSP as a transmission sub-path, where each candidate sub-LSP of the upstream network device is a path between the upstream network device and an intermediate network device neighboring to the upstream network device, and the intermediate network device is a network device on any candidate LSP between the source network device and the destination network device.

The fourth selecting sub-unit is configured to determine whether the intermediate network device is the destination network device or the source network device;

if not, use the intermediate network device as a new upstream network device to continue selecting a transmission sub-path; and if being the destination network device or the source network device, determine a transmission path between the source network device and the destination network device by determining each selected transmission sub-path.

Persons skilled in the art should understand that all or a part of the steps of the method according to the above embodiments may be implemented by a program instructing relevant hardware. The program may be stored in a computer readable storage medium. When the program is run, the steps of the method according to the above embodiments are performed. The storage medium may be any medium that is capable of storing program codes, such as a ROM, a RAM, a magnetic disk, or an optical disk.

The above descriptions are merely specific and exemplary embodiments of the present invention, but not intended to limit the protection scope of the present invention. Any variations or replacements that can be easily derived by persons skilled in the art within the technical scope disclosed by the present invention should fall within the protection scope of the present invention.

What is claimed is:

1. A method for selecting a label switched path (LSP) applied in a Multiple Protocol Label Switching (MPLS) network comprising a source network element and a destination network element, the method comprising:

determining, by a first network element in the network, power consumption information of a port of the first network element;

receiving, by the first network element, an Interior Gateway Protocol (IGP) message, wherein the IGP message carries power consumption information of a port of a second network element in the network;

obtaining, by the first network element, the power consumption information of the port of the second network element from the IGP message; and selecting, according to the power consumption information of the port of the first network element and the power consumption information of the port of the second network element, a transmission path from the source network element to the destination network element.

2. The method according to claim 1, further comprising:
sending, by the first network element, the power consumption information of the port of the first network element to the second network element via an IGP protocol message.

3. The method according to claim 1, wherein the selecting, according to the power consumption information of the port of the first network element and the power consumption information of the port of the second network element, a transmission path from the source network element to the destination network element comprises:

selecting, according to the power consumption information of the port of the first network element, the power consumption information of the port of the second network element and a bandwidth parameter of the second network element, the transmission path from the source network element to the destination network element.

4. The method according to claim 1, wherein the IGP message comprises an Open Shortest Path First OSPF message or an Intermediate System to Intermediate System IS-IS message.

5. The method according to claim 1, wherein selecting, according to the power consumption information of the port of the first network element and the power consumption information of the port of the second network element, a transmission path from the source network element to the destination network element comprises:

obtaining an energy consumption value of each candidate LSP of a plurality of candidate LSPs that exist between the source network element and the destination network element according to power consumption information of a port of each network element on each candidate LSP, wherein the first network element is on at least one of the plurality of candidate LSPs and the second network element is on at least one of the plurality of the candidate LSPs; and selecting a candidate LSP from the plurality of candidate LSPs as the transmission path based on a preset policy according to the energy consumption value of each candidate LSP.

6. The method according to claim 1, further comprising:
uploading, by the first network element, the power consumption information of the port of the first network element and the power consumption information of the port of the second network element to a network management system by extending a management information base MIB, wherein the selecting, according to the power consumption information of the port of the first network element and the power consumption information of the port of the second network element, a transmission path from the source network element to the destination network element comprises:

selecting, by the network management system, according to the power consumption information of the port of the first network element and the power consumption information of the port of the second network element, the transmission path from the source network element to the destination network element; and realizing visualization of LSP energy consumption values.

7. A non-transitory computer readable medium storing a program causing a network device, when implemented by the network device, to:

determine power consumption information of a port of the network device;

receive an Interior Gateway Protocol (IGP) message, wherein the IGP message carries power consumption information of a port of another network device, and obtain the power consumption information of the port of the another network device from the received IGP; and select, according to the power consumption information of the port of the network device and the power consumption infatuation of the port of the another network device, a transmission path from a source network device to a destination network device in the network.

8. The non-transitory computer readable medium according to claim 7, wherein the program causes the network device to:

send the power consumption information of the port of the network device to the another network device in the network via an extended IGP message.

9. The non-transitory computer readable medium according to claim 7, wherein selecting, according to the power consumption info' illation of the port of the network device and the power consumption information of the port of the another network device, a transmission path from a source network device to a destination network device in the network comprises:

selecting, according to the power consumption information of the port of the network device, the power consumption information of the port of the another network device and a bandwidth parameter of the another network device, the transmission path from the source network device to the destination network device.

10. The non-transitory computer readable medium according to claim 7, wherein selecting, according to the power consumption information of the port of the network device and the power consumption information of the port of the another network device, a transmission path from a source network device to a destination network device in the network comprises:

obtaining an energy consumption value of each candidate LSP of a plurality of candidate LSPs that exist between the source network device and the destination network device according to power consumption information of the port of each network device on each candidate LSP, wherein the network device is on at least one of the plurality of candidate LSPs and the another network device is on at least one of the plurality of the candidate LSPs; and     selecting a candidate LSP from the plurality of candidate LSPs as the transmission path based on a preset policy according to the energy consumption value of each candidate LSP.

11. A non-transitory computer readable medium storing a program causing a network device, when implemented by the network device, to:

receive a first Interior Gateway Protocol (IGP) message sent by a first intermediate device between a source network device and a destination network device in a network and a second IGP message sent by a second intermediate device between the source network device and the destination network device, wherein the first IGP message comprises power consumption information of a port of the first intermediate device and the second IGP message comprises power consumption information of a port of the second intermediate device, and     obtain the power consumption information of the port of the first intermediate device from the first IGP message and the power consumption information of the port of the second intermediate device from the second IGP message; and     select, according to the power consumption information of the port of the first intermediate device and the power consumption information of the port of the second intermediate device, a transmission path from the source network device to the destination network device in the network.

\* \* \* \* \*